(12) United States Patent
Veer et al.

(10) Patent No.: US 11,009,105 B2
(45) Date of Patent: May 18, 2021

(54) EASY ADJUST TENSIONER ASSEMBLY

(71) Applicant: AGCO Corporation, Duluth, GA (US)

(72) Inventors: Andrew Mark Veer, Whitewater, KS (US); William Ryan Haar, Valley Center, KS (US)

(73) Assignee: AGCO Corporation, Duluth, GA (US)

( * ) Notice: Subject to any disclaimer, the term of this patent is extended or adjusted under 35 U.S.C. 154(b) by 254 days.

(21) Appl. No.: 16/165,321

(22) Filed: Oct. 19, 2018

(65) Prior Publication Data

US 2019/0203812 A1 Jul. 4, 2019

Related U.S. Application Data

(60) Provisional application No. 62/612,779, filed on Jan. 2, 2018.

(51) Int. Cl.
*F16H 7/12* (2006.01)
*A01D 69/00* (2006.01)
(Continued)

(52) U.S. Cl.
CPC ............ *F16H 7/1281* (2013.01); *A01D 69/00* (2013.01); *F16H 7/02* (2013.01); *F16H 7/06* (2013.01);
(Continued)

(58) Field of Classification Search
CPC ............... F16H 7/08; F16H 2007/0863; F16H 2007/0865; F16H 2007/0876;
(Continued)

(56) References Cited

U.S. PATENT DOCUMENTS 2,341,273 A 2/1944 Helberg
2,663,195 A * 12/1953 Horan .................. F16H 7/1281
474/135
(Continued)

FOREIGN PATENT DOCUMENTS

EP 1 440 766 A1 7/2004
EP 1440766 A1 * 7/2004 ........... B24B 21/025
(Continued)

OTHER PUBLICATIONS

UK Intellectual Property Office, Search Report for related UK Application No. GB11721786.0, dated Jun. 25, 2018.
(Continued)

*Primary Examiner* — Michael R Mansen
*Assistant Examiner* — Raveen J Dias

(57) ABSTRACT

A tensioning bar assembly for a tensioning assembly of a drive system of an agricultural machine includes a longitudinal bar having a longitudinal axis, a top end, and a bottom end. An attachment device is attached to the top end of the longitudinal bar. A compression spring has first and second ends, and is located around a portion of the longitudinal bar. A first spring retainer engages with and retains the first end of the spring. The longitudinal bar has a bolt section, and the bolt section has a threaded portion, an engagement head, and a sleeve section. The sleeve section includes an internally threaded hollow section for receiving the bolt section. The sleeve section is fixed and rotationally attached to the attachment device.

18 Claims, 5 Drawing Sheets

(51) Int. Cl.
*F16H 7/02* (2006.01)
*F16H 7/06* (2006.01)
*F16H 7/08* (2006.01)

(52) U.S. Cl.
CPC ....... *F16H 7/08* (2013.01); *F16H 2007/0806* (2013.01); *F16H 2007/088* (2013.01); *F16H 2007/0863* (2013.01); *F16H 2007/0865* (2013.01); *F16H 2007/0876* (2013.01); *F16H 2007/0893* (2013.01)

(58) Field of Classification Search
CPC ....... F16H 2007/088; F16H 2007/0893; F16H 7/06; F16H 7/10; F16H 7/12; F16H 7/1281; F16H 7/1263; F16H 2007/0844; F16H 2007/0806; F16H 2007/0808; F16H 2007/087
USPC ........................................................ 474/135
See application file for complete search history.

(56) References Cited

U.S. PATENT DOCUMENTS

| | | | | |
|---|---|---|---|---|
| 2,924,982 | A * | 2/1960 | Harrer | F16H 7/0827 474/5 |
| 3,479,894 | A | 11/1969 | Debuhr et al. | |
| 4,324,552 | A * | 4/1982 | Boushek, Jr. | A01D 69/00 474/118 |
| 5,286,233 | A * | 2/1994 | Engelstad | A01D 46/085 474/101 |
| 5,769,747 | A * | 6/1998 | Kuhn | A01D 34/6806 474/135 |
| 6,165,089 | A | 12/2000 | McGreal et al. | |
| 6,334,292 | B1 * | 1/2002 | Walch | A01D 34/76 56/10.2 R |
| 6,398,681 | B1 * | 6/2002 | Wanie | F16H 7/1263 474/101 |
| 6,796,419 | B2 * | 9/2004 | Sousek | F16H 7/1209 198/813 |
| 7,553,248 | B2 * | 6/2009 | Busboom | A01D 69/08 474/134 |
| 10,054,199 | B2 * | 8/2018 | Newman | F16H 7/1281 |
| 2007/0125055 | A1 * | 6/2007 | Ducoulombier | A01D 43/081 56/11.6 |
| 2012/0196710 | A1 | 8/2012 | Lehman et al. | |
| 2017/0059014 | A1 * | 3/2017 | Bailliu | A01F 12/56 |
| 2019/0055993 | A1 * | 2/2019 | Pautz | A01D 41/1243 |

FOREIGN PATENT DOCUMENTS

EP 3 135 956 A1 3/2017
WO 2012/084825 A1 6/2012

OTHER PUBLICATIONS

European Patent Office, International Search Report for related International Application No. PCT/IB2018/057893, dated Jan. 15, 2019.
UK Intellectual Property Office, International Search Report for related UK Application No. GB1721788.6, dated Jun. 25, 2018.

* cited by examiner

EASY ADJUST TENSIONER ASSEMBLY

CROSS REFERENCE TO RELATED APPLICATION

This application claims the benefit of U.S. Provisional Application No. 62/612,779 filed Jan. 2, 2018, which is hereby incorporated by reference in its entirety.

TECHNICAL FIELD

The present invention relates to a tensioner bar apparatus. In particular, the invention relates to a tensioner bar apparatus for use with a tensioner arm for a drive belt. Such a drive belt may typically be found in an agricultural apparatus, such as a combine harvester or other agricultural machine.

BACKGROUND

Combine harvesters and other agricultural machines commonly contain a number of drive systems comprising a belt or chain to transfer power from a drive source to a driven power consuming system. Such belts or chains are often provided with a means for tensioning or taking up slack in the belt or chain in the drive system.

FIG. 1 shows a typical drive system 60 from a combine harvester. The drive system 60 provides drive power to a straw chopper at the rear end of a combine harvester.

The drive system 60 comprises a driving wheel 61 and a driven wheel 62 connected by a belt 63. Tension in the belt 63 is applied by an idler wheel 47, which presses against the belt 63 and is mounted on a tensioning arm 41.

The idler wheel 47 is rotationally mounted on a first end 41a of the tensioning arm 41, and the tensioning arm 41 is pivotally mounted, at a midpoint 41m, to the combine harvester. To the second end 41b of the tensioning arm 41 is connected a tensioner assembly 11, which applies a tensioning force Fa.

The tensioner assembly 11 comprises a longitudinal bar 2. At a first, or 'top' end 2t of the bar 2 is a clevis assembly 3, which is connected to the second end 41b of the tensioning arm 41 by a clevis pin 36. In this prior art arrangement, the longitudinal bar 2 is rotationally fixed to the clevis assembly 3 such that in effect the bar 2 and clevis assembly 3 are a unitary item. A portion 2a of the bar 2 has a screw thread. Fitted over this threaded portion 2a of the bar 2 is a spring 4s, provided with a top retainer 4t and a bottom retainer 4b, which together keep the spring 4s in place.

When in position on the machine, the top retainer 4t butts up against a bracket 20 attached to the combine harvester. The bottom retainer 4b is kept in its position on the bar 2 by a pair of locking nuts 5a, 5b fitted onto the screw thread—a first locking nut 5a for adjustment of spring compression and the second locking nut 5b for locking the first locking nut 5a in place.

When in position on the machine, the spring 4s is effectively compressed between the bracket 20 and the locking nuts 5a, 5b via the action of the top and bottom retainers 4t, 4b, respectively. The action of the spring 4s on the top retainer 4t, and thus the bracket 20, acts to 'push' the bottom retainer 4b, and thus the locking nuts 5a, 5b, away from the bracket 20. As the locking nuts 5a, 5b are threaded onto the longitudinal bar 2, this provides an axial force Fa along the bar 2 which in turn, through the clevis 3 and clevis pin 36, produces a sustained force on the second end 41b of the tensioning arm 41. As the tensioning arm 41 is pivotally mounted 41m, this produces a torque around the pivot point 41p, such that the idler wheel 47, mounted on the first end 41a of the tensioning arm 41, is pressed against the belt 63 and thus provides a tensioning force Ft on the belt 63.

It is occasionally necessary to adjust the tensioning assembly 11, either to change the spring tension or to replace worn or broken components. To do this, when the tensioning assembly 11 is in position, it is necessary first to loosen the second locking nut 5b. This releases the first locking nut 5a to be rotated around, and thus move along, the threaded portion 2a of the longitudinal bar 2, changing the axial position of the bottom retainer 4b and thus adjusting the spring compression (and hence the force with which the spring 4s acts against the bracket 20 and consequently, via the longitudinal bar 2, tensioning arm 41, and idler wheel 47, the tensioning force Ft with which the idler wheel 47 contacts the belt 63). This requires a wrench or spanner, such as an open end wrench/spanner or ratcheting wrench/spanner.

Use of such a wrench or spanner requires the involvement of an operator, and this is a job which is typically tedious and consumes an undesirable amount of time and energy. Further, machines such as a combine harvester, and indeed many other agricultural machines, are typically complex machines with many other components in close proximity to the drive system. Access to the locking nuts 5a, 5b, where an access route is typically required to be substantially perpendicular to the axis of the longitudinal bar 2 when a wrench is used, is therefore not always straightforward, further making the adjustment process problematic. Space is also required to allow for rotational movement of the wrench or spanner around the longitudinal bar 2 so as to rotate the nuts 5a, 5b on the threaded portion 2a. This is particularly challenging when the first part of the operation, namely loosening the second locking nut 5b, may require the use of two wrenches (spanners), due to tightness of the engagement of the locking nuts 5a, 5b—one wrench to hold the first locking nut 5a stationary and provide a reactive torque against the torque applied by a second wrench being used to loosen the second locking nut 5b. Thus, access is typically required for two wrenches. A solution to these problems would be desirable.

BRIEF SUMMARY

Accordingly there is provided in an aspect a tensioning bar assembly 111 for a tensioning assembly 101 of a drive system 60 of an agricultural machine, comprising: a longitudinal bar 102 having a longitudinal axis 2x, a top end 102t, and a bottom end 102b; an attachment device 103 attached to the top end 102t of the longitudinal bar 102; a compression spring 4s having first 6b and second 6t ends, the spring located around a portion of the longitudinal bar; and a first spring retainer 4b for engaging with and retaining the first end 6b of the spring; characterized in that the longitudinal bar comprises a bolt section 121, the bolt section comprising a threaded portion 102a and an engagement head 102h, and a sleeve section 122, the sleeve section comprising an internally threaded hollow section 102c for receipt of the bolt section 121 and further wherein the sleeve section 122 is fixedly rotationally attached to the attachment device 103.

An advantage of this tensioning assembly is that the adjustment of the tensioning assembly may be performed by using a single wrench on the engagement head 102h of the bolt section 121 in order to rotate the bolt section 121 relative to the sleeve section 122, hence altering the overall length of the bar 102. Usefully, the engagement head may not require the use of an open end wrench and may be provided with a head for engagement with a complementary socket, or alternatively a socket for engagement with a complementary head, or similar mechanical arrangement, which complementary head or socket may also be attached to a power tool of some kind, such as a pneumatic socket gun or power screwdriver. This would make the adjustment of the tensioning assembly easier and also potentially a great deal quicker, as well as greatly reducing the physical exertion required by a user in order to adjust the tensioning bar.

In an embodiment, the tensioning bar assembly further comprises a locking nut 105a fitted on the threaded portion 102a of the bolt section 121 of the bar 102, wherein the locking nut may be used to lock the bolt section of the bar in place in relation to the sleeve section of the bar.

A locking nut may be provided so as to assist in 'locking' the bolt portion of the bar axially in place relative to the sleeve portion of the bar. One skilled in the art will readily recognize the technique for this.

In an embodiment, a second spring retainer 4t is provided for engaging with and retaining the second end 6t of the spring.

As will be described below, when in use the tensioning bar assembly will comprise part of a tensioning assembly and will be fitted to a bracket and a tensioning arm. In some embodiments the second end of the spring 6t may directly contact the bracket, but in other embodiments the bar assembly is provided with a second spring retainer which is formed to 'cup' the end of the spring and this second spring retainer either butts up to, or is connected to, the bracket.

The first spring retainer is nominally kept in place longitudinally on the bar by means of the engagement head 102h of the bolt section 121 of the bar 102. When the tensioner bar assembly is in place, the first spring retainer is pushed against the engagement head by the force of the spring 4s.

In an embodiment, the first spring retainer 4b and the engagement head 102h may be a unitary item. It may be that the hex head of the long bolt section 121 is simply very large and so able to retain the spring.

It will be recognized that if the first spring retainer and the engagement head are a unitary item, then engagement of the spring with the first spring retainer may be more easily facilitated, as any potential perpendicular motion of the first spring retainer will be prohibited due to its engagement with the threaded portion of the bar. It will also further facilitate the adjustment of the tensioner bar assembly.

In embodiments, the engagement head 102h at or proximate the bottom end 102b of the bar may be any one or more of; a triangle, square, pentagon or hex head or socket; a posidrive head or socket; a torx head or socket; a slotted or phillips screwdriver receiving socket; a spline head or socket; a pair of locking nuts locked in position on the threaded portion, proximate the bottom end of the bar; or an engagement head device screwed to the bottom end of the bar on the threaded portion, optionally locked in place with a locking nut 105c.

The 'engagement head' of the bolt section of the bar, at or proximate the bottom end of the longitudinal bar, has the purpose of allowing a tool to be applied to the longitudinal bar at a convenient point, and advantageously allows access to the engagement head in a longitudinal direction. Herein the bottom end of the bar may be considered to be the engagement-headed end of the bolt section. Typically, a bolt will have a hex-head engagement head, and in embodiments the bolt section will simply be a long bolt. However, it will be recognized that any shape of 'head' may be used or provided that allows for engagement with a tool that may be used by a user, and it is envisaged that, in particular, the use of a power tool of some description may be facilitated. The bottom end of the bar or end of the bolt section may therefore be provided with any head or socket or other shape which allows engagement with a tool, and in addition to those already listed this may include any one of a head or socket such as Security Torx, Tri-wing, Spanner, Clutch, Mortorq, Frearson, Supadriv, Polydrive, Double square, Bristol, Torq-set, One-way, Pentalobe, TP3, or TTAP head, or indeed any other suitable geometry. The bolt section of the bar will typically be manufactured with such a head or socket in place as a unitary item with the bar.

In a variant, the 'bolt section' of the bar may simply be a length of bar threaded along its entire length, and a suitable head may then be attached to the bottom end of the bar and locked in place with a locking nut 202h, 105c. In a further variant or this variant, a hole may be present across a diameter of the threaded bar, proximate to the bottom end, into which a pin may be inserted, and this may be engaged by a suitable tool.

In an embodiment, the attachment device at the top end of the bar is a clevis.

One skilled in the art will readily recognize and be able to easily determine alternatives to a clevis which may be used as an attachment device, such as a simple hole through the top end of the bar 102t through which a bolt may be fitted or any one of a number of alternatives of bracket, plate, or rod. However, in the art a clevis is generally used and for ease of reference herein a clevis may generally be referred to although it will of course be realized that any suitable alternative will be generally intended to be encompassed by such reference.

In an aspect, there is provided a tensioning assembly 101 for a drive system of a machine, comprising a tensioning bar assembly 111 as described elsewhere herein, and further comprising: a tensioning arm 41 pivotally mounted 41p to the machine; a tensioning device 47 mounted to the tensioning arm for contacting the drive system 60, 63 and applying a tensioning force Ft directly thereto; and a bracket 20 mounted to the machine. The attachment device 103 is attached to the tensioning arm 41 at an attachment point 103p and the second end of the spring 6t is in direct or indirect physical contact with the bracket 20, such that compression of the spring applied by and between the bracket 20 and the first spring retainer 4b provides a resultant force Fa applied to the tensioning arm, via the attachment point, about the pivot mounting point 41p of the tensioning arm, which produces the tensioning force Ft to force the tensioning device 47 into contact against the drive system 63.

The clevis attachment point 103p, where the clevis (or other attachment device) 103 is attached to the tensioning arm, may usefully be a pivot mount where a clevis pin 36 is inserted through holes 135 in arms 132 of the clevis and also through a hole in the tensioning arm 41, and secured by a clip 37. Clevis pins, threaded clevis pins, and alternatives therefor (such as a bolt and nut arrangement) are standard items well known to those skilled in the art, and any suitable pin or alternative may be used. It will be recognized that compression of the spring may be achieved by placing the second end of the spring 6t against the bracket 20 (or against a second spring retainer 4t which is in turn placed against or connected to the bracket. In embodiments, the bracket is provided with a hole through which the bar of the bar assembly is fitted); attaching the clevis to the clevis attachment point, and then adjusting the tensioning bar assembly by rotating the bolt section of the bar (via the method enabled by an aspect of the invention) so as to shorten the bar, and hence move the first spring retainer 4b towards the bracket, thus resulting in a compression of the spring. The spring thus produces a force Fa which acts substantially longitudinally along the axis 102x of the bar to pull the clevis attachment point 103p towards the bracket.

In an embodiment, the tensioning assembly bracket 20 has a facing side 20f facing towards the tensioning arm and a distal side 20d facing away from the tensioning arm; the spring 4s and first retainer 4b are located on the distal side; and the second end of the spring 6t is in direct or indirect physical contact with the distal side 20d of the bracket 20 such that the resultant force Fa acts to pull the attachment point 103p towards the bracket 20.

Differing arrangements of the tensioning arms may be as described in the embodiments below:

In an embodiment, the tensioning arm 41 has a first end 41a and a second end 41b, the tensioning device 47 being mounted proximate to the first end 41a, the clevis (or other attachment device) attachment point 103p is proximate to the second end 41b, and the pivotal mounting 41p of the tensioning arm is at a midpoint 41m between the first and second ends (FIG. 4A).

In an embodiment, the tensioning arm 41 has a first end 41a and a second end 41b, the tensioning device 47 is mounted proximate to the first end 41, the pivotal mounting 41p of the tensioning arm is proximate to the second end 41b, and the clevis (or other attachment device) attachment point 103p is at a midpoint 41m between the first and second ends (FIG. 4B).

In an embodiment, there may be provided a second spring retainer 4t for engaging with and retaining the second end 6t of the spring 4s, and the second spring retainer 4t may further engage with the bracket 20.

The second end 6t of the spring 4s may act directly against the bracket 20, or may act on a second spring retainer 4t which in turn acts upon the bracket 20. It will be recognized that the bracket may comprise a dish or annular groove which acts as a second spring retainer. The longitudinal bar may be positioned so that it passes through a hole or notch in the bracket, and/or may be positioned so that it passes through a hole or a notch in the second spring retainer. The second spring retainer may comprise a hole or notch through which the longitudinal bar passes, and may be attached by an arm so that the spring is laterally displaced from the bracket, as in FIG. 4B. The attachment may be by screws, rivets, a nut/bolt combination 27, a simple clamp or by any other means generally known in the art.

In an embodiment, the second spring retainer and the bracket may be a unitary item. In other words, the bracket may simply be formed so as to fulfil the function of the second spring retainer, or the spring retainer may be formed such as to be bolted to the machine and thus also fulfil the function of bracket.

The tensioning device may be any suitable device for pressing against the drive system of the machine.

The drive system may be a belt drive or may be a chain drive. In either case, the tensioning device may be an idler wheel, roller, or may be a simple bar. Where the drive system is a chain drive, the tensioning device may equally be an idler gear with teeth that engage the chain.

In an aspect, there is provided a drive system comprising a tensioning bar assembly or tensioning assembly as provided herein and wherein the drive system is a belt drive system or a chain drive system.

In an aspect, there is provided an agricultural machine comprising a tensioning bar assembly, a tensioning assembly, or a drive system as provided herein.

In an aspect, there is provided an agricultural machine as provided herein wherein the machine is a combine harvester. The drive system may be a drive system for a straw chopper.

BRIEF DESCRIPTION OF THE DRAWINGS

The invention will now be described in more detail by reference to the attached figures.

DETAILED DESCRIPTION

Figure 1:
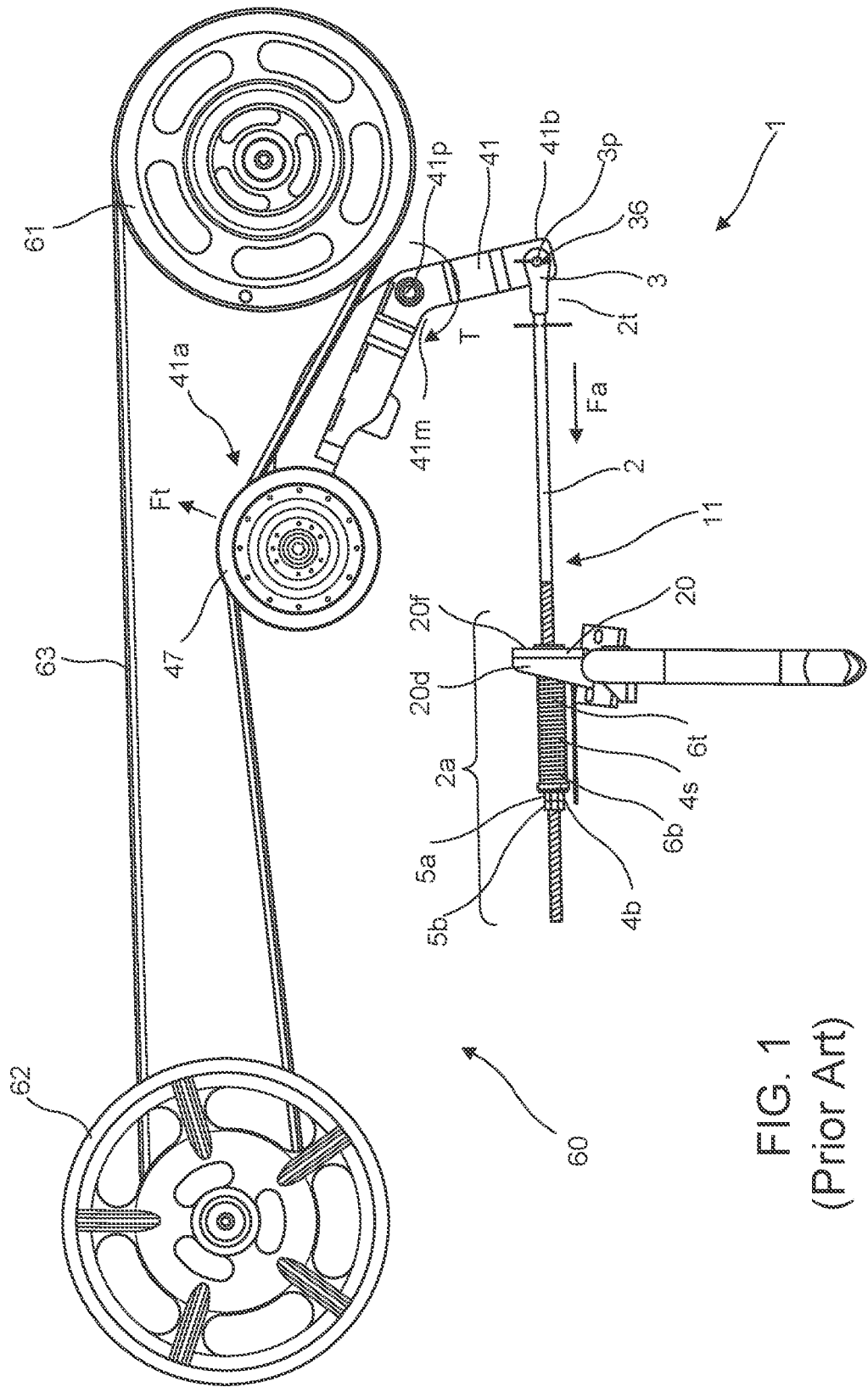
FIG. 1 shows a typical prior art drive system from a combine harvester. It shows a drive system which provides drive power to a straw chopper at the rear end of a combine harvester.
Figure 2:
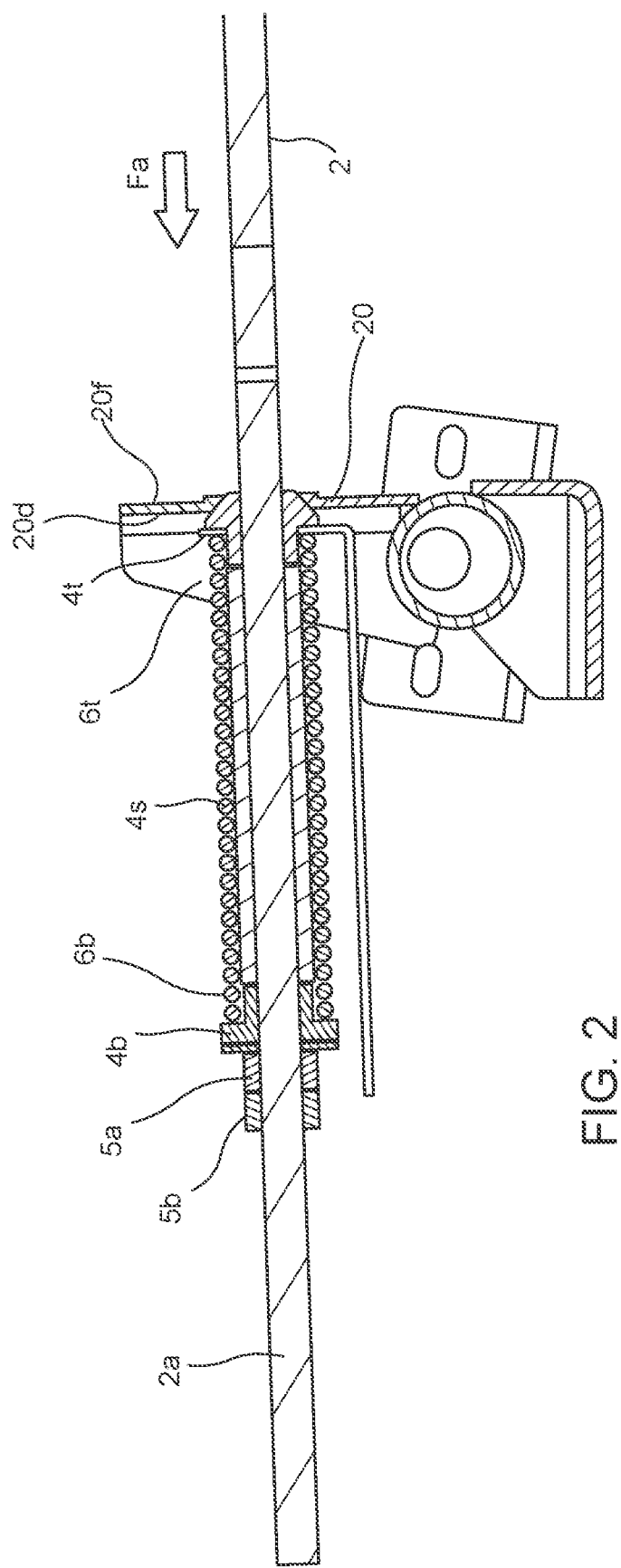
FIG. 2 shows a cross-sectional view through a portion of the prior art tensioning assembly giving more detail of some of the items of FIG. 1.

FIG. 1, as described elsewhere herein, and FIG. 2 show:

The drive system 60 comprises a driving wheel 61 and a driven wheel 62 connected by a belt 63. Tension in the belt 63 is applied by a tensioning system 1. Tensioning system 1 includes an idler wheel 47 which presses against the belt 63 and is mounted on a tensioning arm 41.

The idler wheel 47 is rotationally mounted on a first end 41a of the tensioning arm 41, and the tensioning arm 41 is pivotally mounted on a pivot 41p, at a midpoint 41m, to the combine harvester (not shown). To the second end 41b of the tensioning arm 41 is connected a tensioner assembly 11, which applies a force Fa to the end 41b of the arm 41.

The tensioner assembly 11 comprises a longitudinal bar 2. At a first, or 'top' end 2t of the bar 2 is a clevis assembly 3 which is connected to the second end 41b of the tensioning arm 41 by a clevis pin 36 at an attachment point 3p. In this prior art arrangement, the longitudinal bar 2 is fixed to the clevis assembly 3 such that in effect the bar 2 and clevis 3 are a unitary item. A portion 2a of the bar 2 has a screw thread. Fitted over this threaded portion 2a of the bar 2 is a spring 4s, having first end 6b and second end 6t, and also a first spring retainer 4b and a second spring retainer 4t which together keep the spring 4s in place.

When in position on a combine harvester (or other machine), the second spring retainer 4t butts up against a bracket 20 which is attached, ultimately, to the combine harvester. Bracket 20 has a facing side 20f facing towards the tensioning arm 41 and a distal face 20d facing away from the tensioning arm. The first spring retainer 4b is kept in its position on the bar by a pair of locking nuts 5a, 5b fitted onto the screw thread of bar portion 2a—a first locking nut 5a for adjustment of spring compression and the second locking nut 5b for locking the nuts in place.

When in position on the machine, the spring 4s is effectively compressed between the facing side 20f of bracket 20 and the locking nuts 5a, 5b via the action of the top and bottom (second and first) retainers 4t, 4b on ends of the spring 6t, 6b respectively. The action of the spring 4s on the second retainer 4t, and thus the bracket face 20f, acts to 'push' the first retainer 4b, and thus the locking nuts 51, 5b, away from the bracket 20. As the locking nuts 5a, 5b are threaded onto and thus mechanically joined to the longitudinal bar 2, this provides an axial force Fa along the bar 2 which in turn, through the clevis 3 and clevis pin 36, produces a sustained pulling pressure on the second end 41b of the tensioning arm 41. As the tensioning arm 41 is pivotally mounted, this produces a torque T around the pivot point 41p, such that the idler wheel 47, mounted on the first end 41a of the tensioning arm 41, is pressed against the belt 63 and thus provides a tensioning force Ft on the belt 63.

Figure 3A:
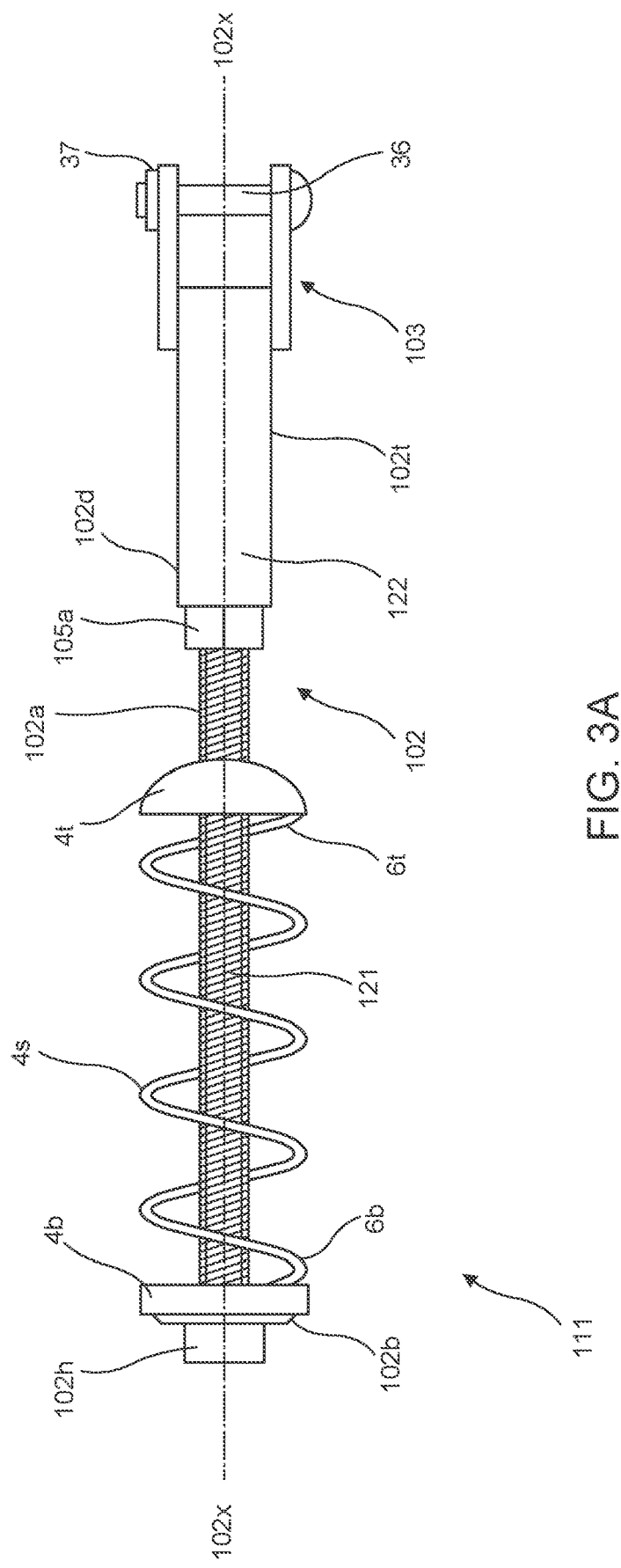
FIG. 3A shows a schematic view of elements of a tensioning bar assembly in accordance with aspects and embodiments of the present application.
Figure 3B:
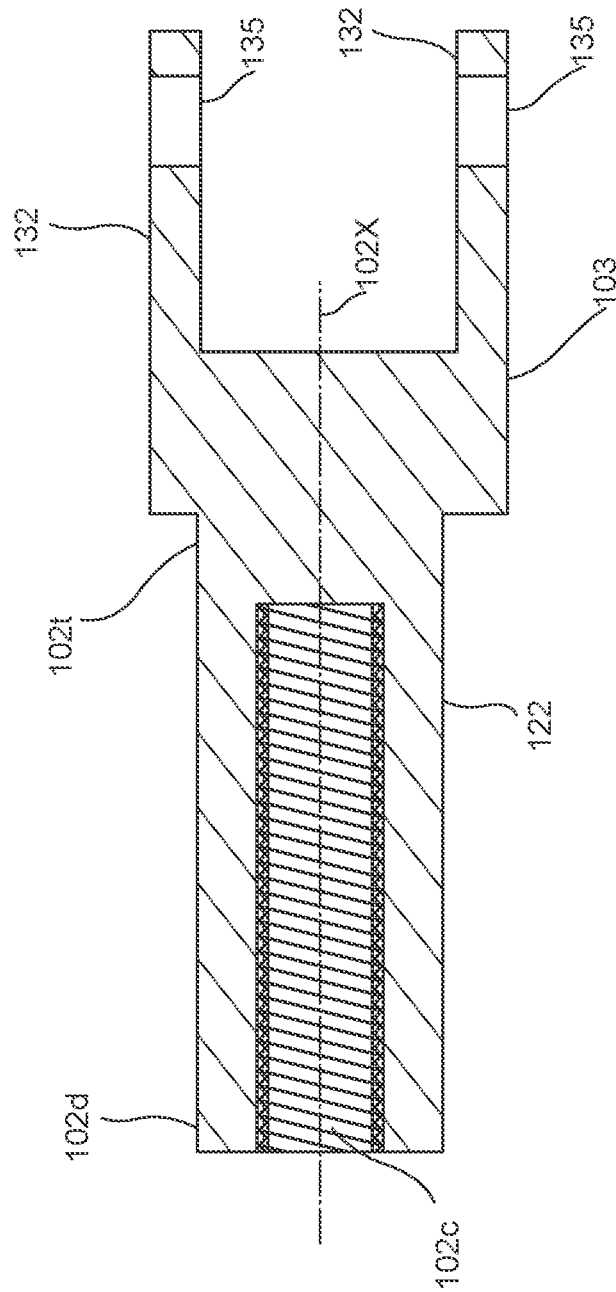
FIG. 3B shows a schematic cross-sectional view of a sleeve section of a tensioning bar, unitary with a clevis attachment device, in accordance with aspects and embodiments of the present application.

FIG. 3A shows a tensioning bar assembly 111 in accordance with aspects and embodiments of the invention of the present application, for use as a replacement or alternative for the prior art tensioning bar assembly shown in FIGS. 1 and 2. FIG. 3B shows a cross-sectional view through sleeve portion 122.

There is provided a longitudinal bar 102 having a first, or top end 102t which is attached to (or unitary with) an attachment device, in this case a clevis 103 and which is formed in two parts: a sleeve portion 122 which is hollow and has a threaded internal diameter along a portion of its length; and a bolt section 121 which in this embodiment is very simply in the form of a long bolt having a hexagonal engagement head 102h and a threaded portion 102a which extends the full length of the bolt. The bolt section 121 is screwed into the sleeve portion 122 and is locked in place with a lock nut 105a which is also threaded onto the bolt portion. A tool, preferably a power tool, can clearly be applied to hex head 102h. Spring 4s with ends 6b and 6t and first and second spring retainers 4b and 4t are also fitted around the threaded portion 102a of the bolt section of the bar, at either end of the spring 4s.

As described hereinbefore, the arrangement shown in FIGS. 3A and 3B allows for the simple adjustment of the tensioning bar assembly 111 by engaging a tool at locking nut 105a, which can then be backed off, and the bolt section 121 can then be rotated by application of a tool (advantageously potentially a power tool) to the hex head 102h, thus rotationally moving bolt section 121 relative to sleeve section 122 and hence either shortening or lengthening the bar 102. Locking nut 105a can then be rotated/screwed along the bar until it butts up against the bottom end 102d of the sleeve portion, locking bolt section 121 and sleeve section 122 into position relative to each other. A final tightening operation with a wrench on nut 105a may be required to fully lock the nut 105a into position. Such an operation will be familiar to one skilled in the art.

Figure 4A:
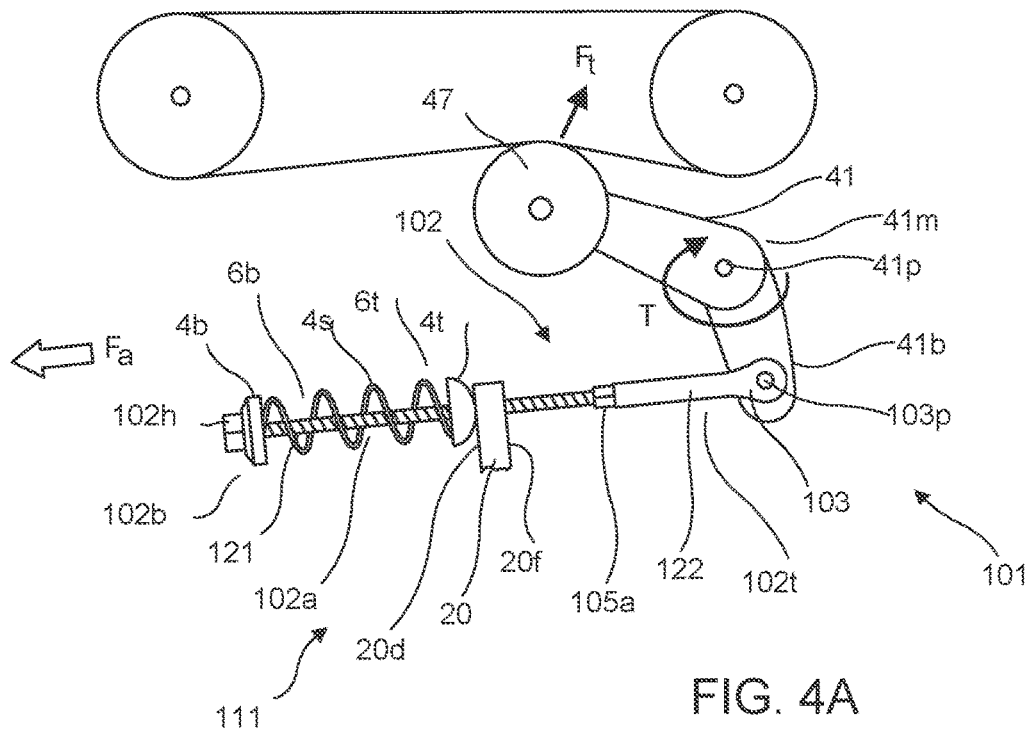
FIGS. 4A and 4B show alternative schematic arrangements of bar, bracket, spring and tensioner arm in accordance with embodiments of the invention —4A where the overall configuration is similar to that of FIG. 1, and 4B where the tensioner arm is mounted in an alternative manner.

FIG. 4A shows an embodiment in which a tensioning bar assembly and tensioning assembly according to embodiments of the invention is in place in relation to a drive system 101 in a configuration generally similar to that of prior art FIG. 1.

Figure 4B:
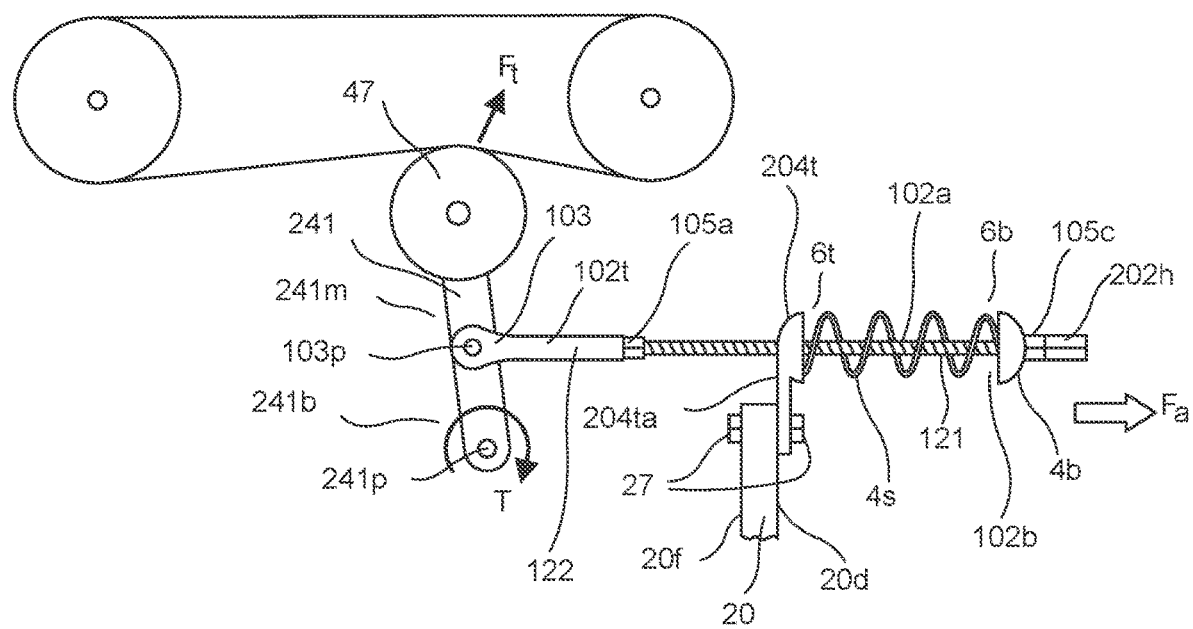

FIG. 4B shows an alternative embodiment where force Fa is a pulling force on tensioning arm 241 and tensioning arm 241 is pivoted at a pivot point 241p about its second end 241b with clevis 103 attached at a pivot point 103p to a midpoint 241m. In this embodiment, spring retainer 204t has an arm 204ta which is bolted by nut and bolt assembly 27 to bracket 20. In this way, the spring 4s acts indirectly against the distal face 20d of the bracket 20. Also in this embodiment, bolt section 121 is a simple length of threaded bar. Engagement head 202h is threaded onto the end 102b of the bolt section and locked in place with further locking nut 105c.

Clearly the skilled person will recognize that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A tensioning bar assembly for a tensioning assembly of a drive system of an agricultural machine, the tensioning bar assembly comprising:
   a longitudinal bar having a longitudinal axis, a top end, and a bottom end, the longitudinal bar comprising a bolt section and a sleeve section, the bolt section comprising a threaded portion and an integrated engagement head, the sleeve section comprising an internally threaded hollow section for receipt of the bolt section;
   an attachment device attached to the top end of the longitudinal bar, wherein the sleeve section is fixedly rotationally attached to the attachment device;
   a compression spring having first and second ends, the compression spring located around a portion of the longitudinal bar; and
   a first spring retainer engaging with and retaining the first end of the compression spring.

2. The tensioning bar assembly of claim 1, further comprising a locking nut fitted on the threaded portion of the bolt section of the longitudinal bar, wherein the locking nut is configured to lock the bolt section of the longitudinal bar in place in relation to the sleeve section of the longitudinal bar.

3. The tensioning bar assembly of claim 1, further comprising a second spring retainer engaging with and retaining the second end of the compression spring.

4. The tensioning bar assembly of claim 1, wherein the first spring retainer is integrated with the bolt section as a unitary item comprising the threaded portion, the first spring retainer, and the integrated engagement head.

5. The tensioning bar assembly of claim 1, wherein the integrated engagement head of the bolt section of the longitudinal bar comprises a head selected from the group consisting of a triangle head, a square head, a pentagon head, a hex head, a triangle socket, a square socket, a pentagon socket, a hex socket, a posidrive head, a posidrive socket, a torx head, a torx socket, a slotted-screwdriver-receiving socket, a Phillips-screwdriver-receiving socket, a spline head, a spline socket, and a pair of locking nuts locked in position on the threaded portion of the longitudinal bar proximate the bottom end of the longitudinal bar.

6. The tensioning bar assembly of claim 1, wherein the attachment device is a clevis.

7. A tensioning assembly for a drive system of an agricultural machine, the tensioning assembly comprising:
   a longitudinal bar having a longitudinal axis, a top end, and a bottom end, the longitudinal bar comprising a bolt section and a sleeve section, the bolt section comprising a threaded portion and an integrated engagement head, the sleeve section comprising an internally threaded hollow section for receipt of the bolt section;
   an attachment device attached to the top end of the longitudinal bar, wherein the sleeve section is fixedly rotationally attached to the attachment device;

a compression spring having first and second ends, the compression spring located around a portion of the longitudinal bar; and a first spring retainer engaging with and retaining the first end of the compression spring;

a tensioning arm pivotally mounted at a pivot mounting point to a machine carrying the drive system;

a tensioning device mounted to the tensioning arm and configured to apply a tensioning force directly to the drive system; and a bracket configured to be mounted to the machine;

wherein the attachment device is attached to the tensioning arm at an attachment point and the second end of the compression spring is in direct or indirect physical contact with the bracket, such that compression of the compression spring applied by and between the bracket and the first spring retainer applies a resultant force to the tensioning arm, via the attachment point, about the pivot mounting point of the tensioning arm, which produces the tensioning force to force the tensioning device into contact against the drive system.

8. The tensioning assembly of claim 7, wherein:

the bracket has a facing side facing towards the tensioning arm and a distal side facing away from the tensioning arm;

the compression spring and first spring retainer are located on the distal side; and the second end of the compression spring is in direct or indirect physical contact with the distal side of the bracket such that the resultant force acts to pull the attachment point towards the bracket.

9. The tensioning assembly of claim 7, wherein:

the tensioning arm has a first end and a second end;

the tensioning device is mounted proximate to the first end;

the attachment point is proximate to the second end; and the pivotal mounting of the tensioning arm is at a midpoint between the first and second ends of the tensioning arm.

10. The tensioning assembly of claim 7, wherein:

the tensioning arm has a first end and a second end;

the tensioning device is mounted proximate to the first end;

the pivotal mounting of the tensioning arm is proximate to the second end; and the attachment point is at a midpoint between the first and second ends of the tensioning arm.

11. The tensioning assembly of claim 7, further comprising a second spring retainer engaging with and retaining the second end of the compression spring and wherein the second spring retainer further engages with the bracket.

12. The tensioning assembly of claim 11, wherein the second spring retainer and the bracket are a unitary item.

13. The tensioning assembly of claim 7, wherein the tensioning device comprises an idler wheel and the drive system comprises a belt-drive system or a chain-drive system.

14. The tensioning assembly of claim 7, wherein the tensioning device comprises an idler gear and the drive system comprises a chain-drive system.

15. A drive system comprising the tensioning bar assembly of claim 1.

16. A drive system comprising the tensioning assembly of claim 7.

17. An agricultural machine comprising the drive system of claim 15.

18. An agricultural machine comprising the drive system of claim 16.

* * * * *